Dec. 13, 1966     E. J. ZAHURANEC ETAL     3,290,763
METHOD OF CONNECTING MULTIPLE FLUID LINES
Original Filed May 25, 1962                3 Sheets-Sheet 1
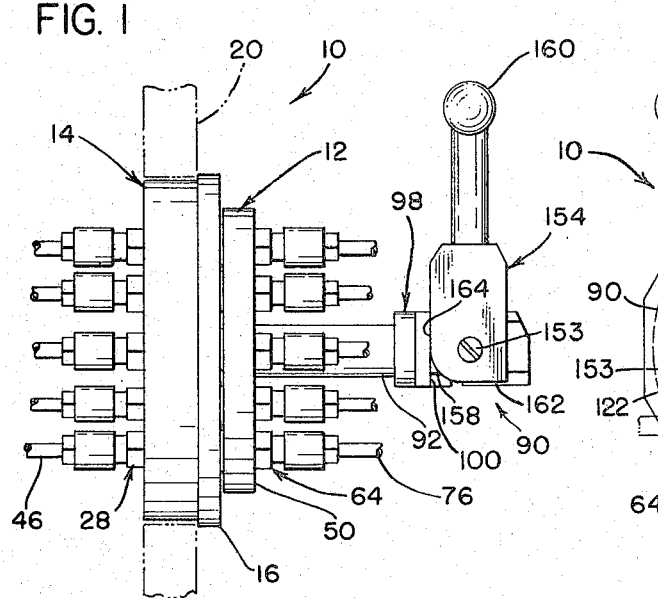
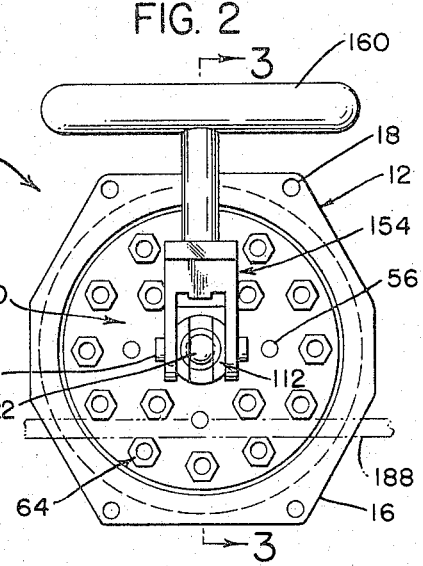
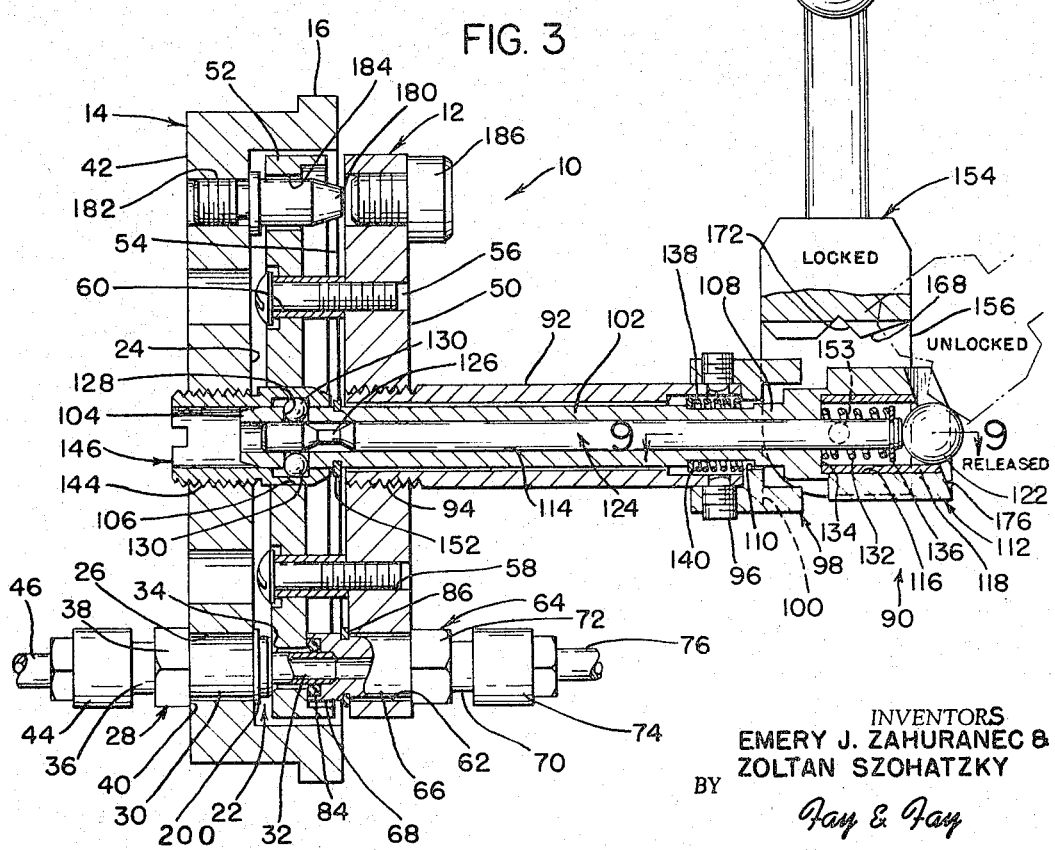
INVENTORS
EMERY J. ZAHURANEC &
ZOLTAN SZOHATZKY
BY
*Fay & Fay*
ATTORNEYS Dec. 13, 1966    E. J. ZAHURANEC ETAL    3,290,763

METHOD OF CONNECTING MULTIPLE FLUID LINES

Original Filed May 25, 1962    3 Sheets-Sheet 2

INVENTORS
EMERY J. ZAHURANEC &
BY ZOLTAN SZOHATZKY

*Fay & Fay*

ATTORNEYS

Dec. 13, 1966 E. J. ZAHURANEC ETAL 3,290,763
METHOD OF CONNECTING MULTIPLE FLUID LINES
Original Filed May 25, 1962 3 Sheets-Sheet 3
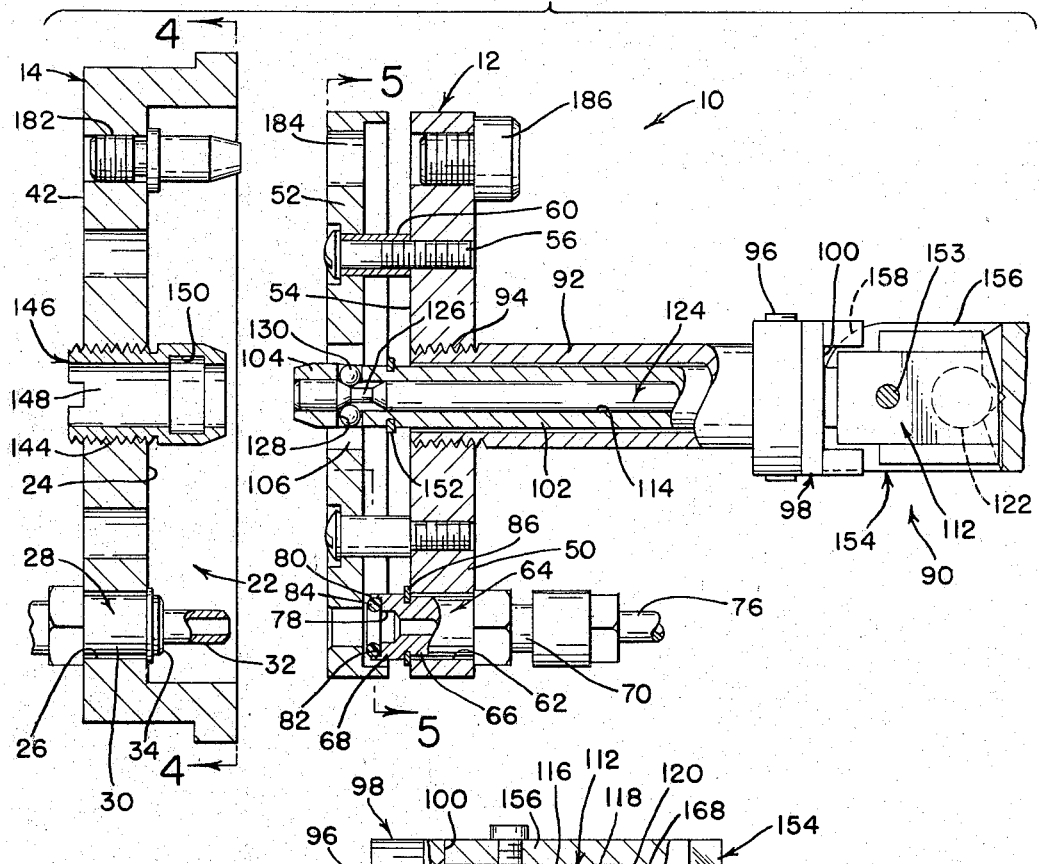
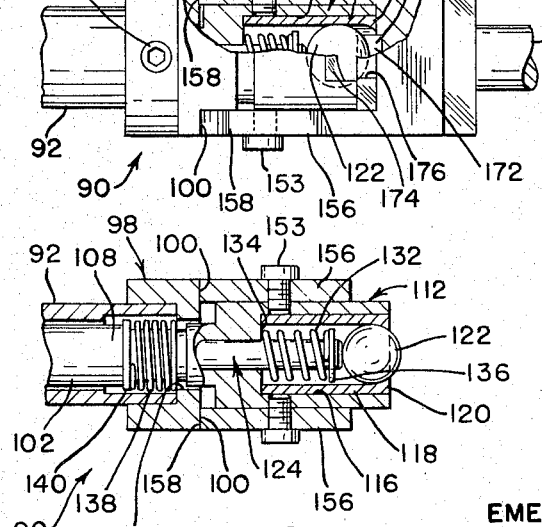
INVENTORS
EMERY J. ZAHURANEC &
BY ZOLTAN SZOHATZKY
*Fay & Fay*
ATTORNEYS United States Patent Office 3,290,763
Patented Dec. 13, 1966

3,290,763
METHOD OF CONNECTING MULTIPLE FLUID LINES
Emery J. Zahuranec, Bedford, and Zoltan Szohatzky, Cleveland, Ohio, assignors to Crawford Fitting Company, Cleveland, Ohio, a corporation of Ohio
Original application May 25, 1962, Ser. No. 197,713, now Patent No. 3,214,195, dated Oct. 26, 1965. Divided and this application Dec. 4, 1963, Ser. No. 339,314
4 Claims. (Cl. 29—157)

This application is a division of application Serial No. 197,713, filed May 25, 1962 and now Patent 3,214,195.

This invention is concerned with coupling devices having particularly useful application in connecting together a multiplicity of noncommunicating fluid lines and, more specifically, it is concerned with a method of connecting a plurality of fluid lines to a common base.

The relatively rapid expansion of the processing and instrumentation industries over the past few years has underlined the need for a coupling device which may be used in simultaneously connecting and disconnecting a multiplicity of fluid conducting lines. In these industries, it is often necessary to couple a large number of relatively small lines used in feeding gauges, metering apparatus, test equiment, process control devices and other instruments of the type commonly used in connection with large control panels and the like.

In the case of complex panels, test chambers and so on, scores of feed lines and other fluid conduits may form a part of the system. It is necessary in systems of this type to connect and disconnect these fluid feed lines for purposes of cleaning, maintenance and replacement of various system components and test fixtures. Usually, this necessity is repeated with a relatively high degree of frequency.

In the past, it has not uncommonly been the case to fit each line with one or more separate connectors. Obviously, the task of connecting and disconnecting a number of such lines each time it is necessary to do so can and does reach sizeable proportions in terms of time expenditure and human effort. This unhappy fact is reflected in the high cost of operation and maintenance.

In order to conserve time and effort in coupling and uncoupling multiple lines of the type described, the invention in our Patent No. 3,214,195 contemplates the use of the appropriate means by which a single coupling device may be used for the purpose of connecting and disconnecting plural lines, thus to minimize the problems which have heretofore prevailed in operating and maintaining complex fluid handling equipment and installations of the type prevalent in instrumentation, processing and testing environments.

It is apparent from our Patent No. 3,214,195 that the coupling device for the multiple fluid lines includes male and female base members in which male and female coupling members are received. The coupling members are closely spaced thereby rendering it difficult to employ a wrench in assembling the fluid lines to the coupling members on the base.

It is an object of this invention to provide a method of connecting a plurality of fluid lines to a common base. The method contemplates the provision of a base having a plurality of closely spaced apertures in a plurality of rows and placing in each aperture a coupling member having tool pad means and rotatable coupling nut means threaded on the free end thereof. An elongated holding means is positioned between adjacent rows of coupling members and in simultaneous frictional engagement with the tool pad means of coupling members in the adjacent rows. Each of the coupling nut means may then be rotated while the elongated holding means prevents rotation of the coupling body thereby to secure the fluid lines to the coupling member.

Other objects and advantages of the invention will be apparent from the detailed description to follow.

Referring now to the drawings:

FIG. 1 is a side elevation of a coupling device for multiple fluid lines showing the coupling parts in the connected and locked position;

FIG. 2 is a front elevation of the coupling device shown in FIG. 1 and showing in phantom the manner in which elongated holding tool means may be inserted between adjacent fluid conducting members to maintain them against rotation during take up of the coupling nut means;

FIG. 3 is an enlarged view partly in section taken along lines 3—3 of FIG. 2;

FIG. 7 is a view similar to FIG. 6 showing the coupling members detached from one another;

FIG. 8 is a fragmentary plan view with parts broken away and taken on line 8—8 of FIG. 6;

FIG. 9 is a fragmentary sectional view taken on line 9—9 of FIG. 3.

Figure 4:
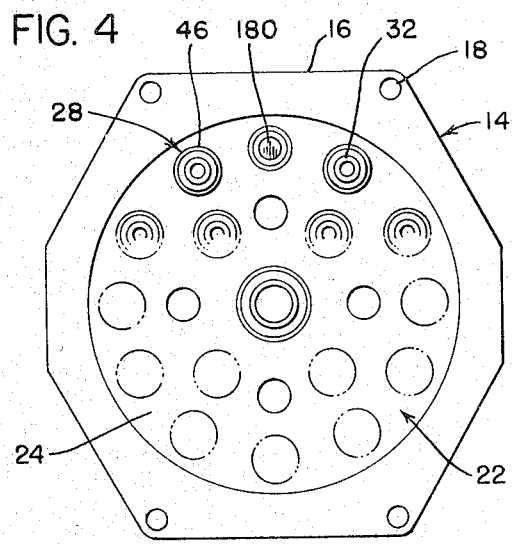
FIG. 4 is a front view of one of the coupling members taken on line 4—4 of FIG. 7.
Figure 5:
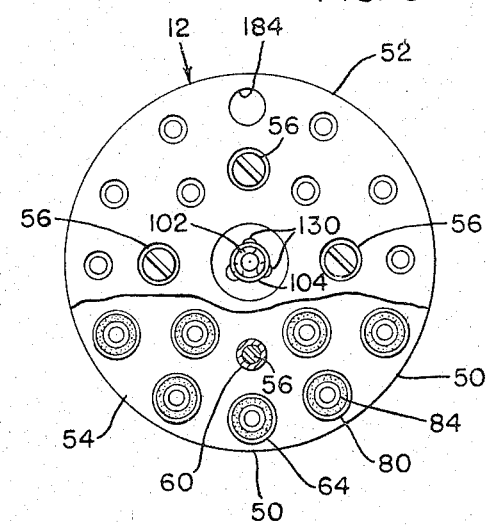
FIG. 5 is a front view of the other coupling member taken on line 5—5 of FIG. 7.

Referring now more particularly to the drawings, we have shown in FIGS. 1-9 one preferred coupling design embodying the principles of the invention. In these figures will be seen a coupling device indicated generally at 10 for connecting multiple fluid lines, and including a pair of male and femals coupling members 12 and 14, respectively. If desired, the female coupling member 14 may be provided with a suitable external flange as at 16 having spaced fastener receiving apertures 18 for mounting, in cooperation with suitable fasteners (not shown), such member to a panel, bulkhead or the like shown in phantom at 20 in FIG. 1.

Th female coupling member 14 is provided with a generally axial inwardly extending socket 22 having transverse bottom wall defining means 24 at its inner end.

A number of apertures formed on axes generally parallel to the axis of the female coupling member 14 extend through the transverse bottom wall defining means 24 as seen at 26. In each such aperture may be mounted a male nipple member 28. The central portion 30 of each male nipple member is disposed within its associated apertures 26 and preferably is so proportioned relaitve to such aperture as to provide a clearance of sufficient magnitude to allow limited lateral translation of the nipple relative to the female coupling member 14.

Projecting longitudinally forwardly of the central portion 30 is a portion 32 of reduced diameter and joined to the central portion by means of a radial shoulder 34. This reduced diameter portion 32 is adapted to be received within a female fluid conducting member to be described subsequently.

At the other end of the central portion 30 is a longitudinally rearwardly projecting portion 36 provided with enlarged diameter tool pad means 38 joined to the central portion 30 by means of a radial shoulder 40 which engages the rear face 42 of the transverse bottom wall defining means 24. At its free end the portion 36 is provided with appropriate coupling means 44 for connecting to the male nipple member a fluid conducting line 46.

A lock ring 200 encircles the central portion 30 of the male nipple member adjacent the transverse bottom wall 24 and in cooperation with the tool pad means 38 maintains the male nipple member against displacement from the aperture 26. Particularly useful for this purpose is a crescent ring because it permits a slight degree of angular movement of the male nipple member relative to the female coupling member 14 to accommodate slight misalignment of male and female fluid conducting members.

The male coupling member 12 includes a transverse base plate member 50 and a coaxial compression plate member 52 generally parallel to the base plate 50 but spaced forwardly therefrom along the axis of the male coupling member. At least the compression plate member 52 is of a size to be received in the socket 22 of the female coupling member 14, and when so received both the compression plate member 52 and the base plate member 50 are generally coaxial with the female coupling member 14 and in general parallelism with the transverse bottom wall defining means 24 of the socket 22.

As will be observed, the base plate member 50 defines a transverse end wall 54 opposed to the bottom wall defining means 24 of the socket 22 and substantially parallel thereto. The compression plate member 52 is disposed between these two wall defining means and is mounted upon base plate member 50 for limited axial movement toward and away from the transverse end wall 54. Any suitable means may be used for this purpose, although I have shown in the illustrated embodiments a plurality of elongated headed machine bolts 56 screwed into threaded apertures 58 passing through base plate member 50. A sleeve 60 disposed about a shank of each bolt 56 engages at opposite ends the head and the transverse end wall 54 of the base plate 50 to insure proper spacing between compression plate member 52 and base plate member 50.

A plurality of apertures 62 extend through the base plate member 50 in coaxial relationship, when the device is coupled, with the apertures 26 in the female coupling member 14. Carried in each aperture 62 is a female fluid conducting member 64 having a central portion 66 disposed within the aperture 62 and a portion 68 extending longitudinally forwardly from the transverse end wall defining means 54 of the base plate 50. Portion 70 extends rearwardly from the base plate member 50 and is provided adjacent the rear face of such member with enlarged diameter tool pad means 72. Suitable coupling means 74 is provided for attaching an appropriate fluid line 76 to the female fluid conducting member 64. The forwardly extending portion 68 of the female fluid conducting member 64 is counterbored as at 78 to receive snugly the forwardly extending portion 32 of the cooperating male nipple member 28. The end face 80 of each female fluid conducting member, as will be seen in FIGS. 6 and 7, initially terminate short of the opposed compression plate member 52, but is subsequently brought substantially into engagement therewith upon take up of the coupling device. The end face 80 may, where desirable, provide a suitable annular groove 82 to receive elastomer sealing means 84.

A suitable lock ring 86, preferably of the crescent variety, is employed to hold each female fluid conducting member within its associated aperture in the base plate member and, as will be noted, suitable clearances are provided between the apertures and female fluid conducting members so as to allow for limited lateral and angular movements, thereby to accommodate misalignment of the female fluid conducting members relative to the male nipple members.

In the illustrated embodiments, it will be noted that the elastomer sealing means 84 in the free state extends longitudinally beyond the end face 80 of its associated nipple so as to be substantially compressed by movement of the compression plate member 52 in the direction toward transverse end wall 54.

Operating means, indicated generally at 90, is employed for locking the coupling members together and for drawing the compression plate member 52 toward the transverse end wall defining means 54 of the base plate member 50, thereby to compress the elastomer sealing means 84 and perfect leak-tight joints between each male and female fluid conducting member. The operating means includes an elongated outer sleeve 92 attached to the base plate 50 centrally thereof as by means of cooperating threads 94.

Attached at the free end of the outer sleeve 92 as by means of set screws 96 or the like is a cam shoe 98 providing bearing surfaces 100. A concentric inner sleeve 102 is slidably received within the outer sleeve 92. The forward end 104 of the inner sleeve projects longitudinally beyond the base plate and compression plate members 50 and 52, respectively, through coaxial aperture 106 provided in the compression plate member 52.

The rearward end 108 of the inner sleeve 102 projects longitudinally beyond the rearward end of the outer sleeve 92 through coaxial aperture 110 provided in the cam shoe 98. Affixed to the rearward end 108 of the inner sleeve 102 is a housing member 112 having concentric bores and counterbores 114 and 116, respectively, generally coaxial with the inner and outer sleeves 102 and 92, respectively.

Counterbore 116 forms a chamber within which a hollow bushing member 118 is received. Suitable indention means 120 are formed at the rearward terminus of the bushing to retain within the bushing a loosely mounted ball 122. An elongated rod 124 is slidably received within inner sleeve 102 and at its forward end portion is provided with a circumferential groove 126 adapted upon reciprocation of the rod 124 to move into and out of communication with spaced radial openings 128 provided in the forward end portion of the inner sleeve 102. Disposed within each radial opening 128 is a suitable detent member 130.

The rearward end portion of rod 124 extends through bore 114 into the hollow bushing member 118 to engage ball 122. Compression spring 132, at one end, engages radial shoulder 134 on the housing member 112, and at the other, snap ring 136 on rod 124 normally to bias the rod axially rearwardly. At the same time compression spring 138 engages flange 140 on the inner sleeve 102 and external flange 140 on the inner sleeve 102 and internal flange 142 on cam shoe 98 to bias normally the inner sleeve 102 axially forwardly.

Figure 6:
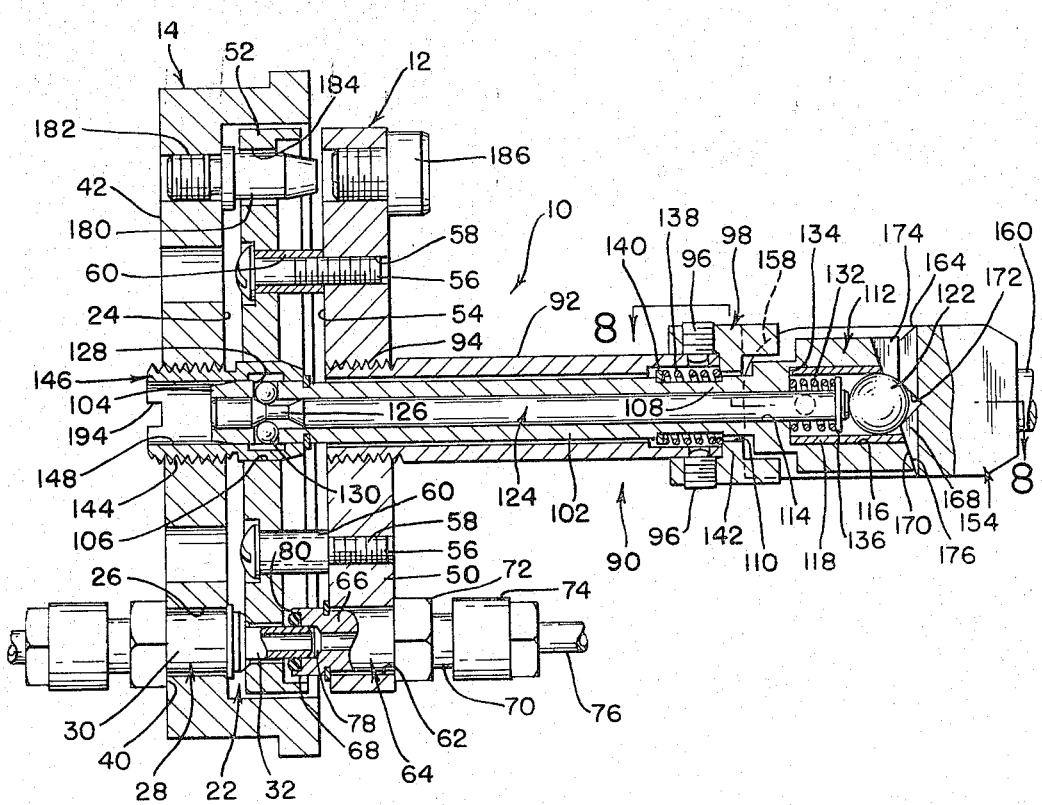
FIG. 6 is a view similar to FIG. 3 showing the coupling members telescoped prior to actuation of the operating means to lock the members together and to draw them toward one another to compress the sealing means.

Centrally mounted to the female coupling member 14 by cooperating threads 144 or the like is a hub 146 having a bore 148 therethrough in coaxial alignment with and of a size snugly to receive the forward end portion of inner sleeve 102 on the male member, as seen in FIGS. 3 and 6. Bore 148 is provided with an annular, inwardly opening detent receiving recess 150 adapted to register with radial openings 128 of inner sleeve 102 when the coupling member are telescoped. Overinsertion of the inner sleeve 102 into the bore 148 of hub 146 is prevented by snap ring 152 located at the forward end portion of the inner sleeve. This insures the fact that the radial openings 128 and the detents 130 will always fall into registry with the detent receiving recess 150.

Forming a part of operating means 90 and mounted by pivots 153 to housing 112 for rotation about an axis perpendicular to that of rod 124 and sleeves 92 and 102, is an actuator which includes a body 154 having spaced depending parallel legs 156 which straddle housing 112 and rod 124. The edges of such legs opposed to bearing surfaces 100 on cam shoe 98 are provided with arcuate cam surfaces 158 which engage such bearing surfaces 100 upon rotation of the actuator by means of handle 160.

As will be noted from an examination of the drawings, the radial distance from the pivot axis of the actuator to the end edges 162 of legs 156 is somewhat less than the radial distance to the side edges 164 of such legs. Consequently, rotation of the actuator about its axis from the position shown in FIG. 6, for example, to that shown in FIG. 1 will result in a rearward axial movement of the inner sleeve 102 as the zone of engagement of the edge of such parallel leg 156 its associated bearing surface 100 moves from end edge 162 along cam surface 158 to side edge 164.

Disposed between legs 156 is a camming member 168 which includes a sloping forward surface 170 and a communicating notch 172. A slot 174 generally coplanar with the camming member 168 is formed in the rearward terminus of the housing 112 to accommodate the camming member when the actuator is in the position shown in FIGS. 6, 7 and 8. The bottom 176 of the slot 174 is formed on an angle generally complementary to that of the sloping forward surface 170 of the camming member 168 so as to provide a stop to limit clockwise rotation of the actuator and, additionally, to insure the fact that the camming member 168 may swing freely in and out of the slot 174 upon rotation of the actuator.

It will be observed that upon clockwise rotation of the actuator, ball 122 will be cammed forwardly as the sloping forward surface 170 moves relative thereto resulting in a forward axial movement of the rod 124 relative to the inner and outer sleeves 102 and 92, respectively. When the sloping forward surface 170 comes into engagement with the bottom wall 176 of the slot 174, rotation of the actuator reaches its clockwise limit and ball 122 becomes releasably locked in notch 172, thereby to hold the rod 124 at the forward extremity of its reciprocation.

To insure proper orientation between corresponding male and female fluid conducting members, a guide or locator pin 180 is mounted upon the female member 114 in the illustrated embodiment as by means of cooperating threads 182 or the like. An aperture 184 is provided in the compression plate member 52 and receives the locator 180 when the coupling members are assembled. In this way, it is impossible to insert the male coupling member into the female coupling member in any way but that originally intended. For convenience, a suitable indicator 186 of colored plastic or the like may be mounted upon the base plate in aligned relationship with the aperture 184 to assist the operator in obtaining proper registration between such aperture and the locator pin 180 during assembly of the coupling members.

An important feature of the invention lies in the manner in which the various male nipple fluid conducting members and, similarly, the female fluid conducting members are oriented relative to one another in order to reduce the over-all size of the fitting components without at the same time reducing the maximum number of male and female fluid conducting members which may be carried by the coupling device. For the sake of simplicity in the drawings, the male nipple members, for example, have been shown as being spaced a considerable distance from one another. In actual practice, however, these members would normally be positioned so close to one another that it would be impossible to apply a wrench to the tool pads 38 in order to hold such members against rotation while coupling nut 44 is being taken up. To avoid this problem, the male nipple members and, similarly, the female fluid conducting nipple members are mounted in relatively closely spaced parallel rows as seen, for example, in FIG. 2. This permits an elongated holding tool means, such as rod 188 shown in phantom in FIG. 2, to be inserted between adjacent rows in the region of tool pad means 38 and thereby simultaneously to lock all the nipple members in each of these two rows against rotation while a suitable socket wrench is utilized to take up coupling nuts 44 which, incidentally, are provided with tool pads having substantially smaller cross-sectional dimensions than those of tool pads 38. It will be understood, of course, that the foregoing principle is applied as well to the female fluid conducting members.

In operation, when it is desired to connect together the male and female coupling members 12 and 14, respectively, and thereby establish fluid communication between the multiplicity of male nipple members and female fluid conducting members, the male and female coupling members 12 and 14 are first aligned with one another as shown in FIG. 7, for example. To aid in such alignment, the operator may avail himself of the indicator 186 and locator means 180. Next, the male and female coupling members 12 and 14 are moved axially toward one another until the male coupling member is positioned within socket 22 of female coupling member 14. Cooperating guide pin 180 and aperture 184 insure the fact that the multiple fluid lines to be connected are properly oriented with respect to one another, thereby to prevent the wrong lines from being coupled to one another.

It will be noted from an observation of FIG. 6 that the compression plate member 52 is at this point of the coupling action engaged by radial shoulders 34 of the male nipple members, but has not as yet been drawn into engagement with sealing means 84. The actuating means is so positioned that ball 122 is maintained in depressed relationship under the influence of camming member 168. As a consequence, spring 132 is compressed and rod 124 is held at the forward extremity of its reciprocal movement in order that detent means 130 may be received in groove 126 to permit the forward end of inner sleeve 102 to be passed into bore 148 of hub 146.

When the coupling components have reached the relative positions shown in FIG. 6, the actuating means 154 is rotated in a counterclockwise direction using handle 160. During the first few degrees of rotation, ball 122 moves downwardly along sloping forward surface 170 of camming member 168, thereby permitting spring 132 to elongate and draw rod 124 rearwardly, as shown, for example, in FIG. 3. Such rearward movement causes detent means 130 to be cammed from groove 126 radially outwardly into locking engagement with detent receiving recess 150.

Continued counterclockwise rotation of actuating means 154 causes movement of arcuate camming surfaces 158 relative to bearing surfaces 100, thereby to draw inner sleeve 102 and rod 124 rearwardly relative to outer sleeve 90, and base plate member 50. Inasmuch as detent means 130 are now firmly locked within detent receiving recess 150, female coupling member 14 is drawn in the same direction as inner sleeve 102 and rod 124. Radial shoulders 34, in turn, cause movement of compression plate member 52 toward base plate member 12 with a resultant compression of sealing means 84 between the rear face of the compression plate member and end face 80 of female fluid conducting members 64, thereby to affect a seal between such female fluid conducting members and the forward portion 32 of male nipple members 28.

To disconnect the coupling members, actuating means 154 is rotated in a counterclockwise direction from that position shown in FIG. 1, thereby permitting compression spring 138 to elongate and urge inner sleeve 102 and rod 124 forwardly relative to outer sleeve 92 and base plate member 50. This releases compression plate member 52 and permits sealing means 84 to decompress. Continued clockwise rotation of the actuating means causes depression of ball 122 and consequent forward axial movement of rod 124 to bring groove 126 into communciation with detents 130 permitting them to move radially inwardly out of locking relationship relative to detent receiving recess 150 in hub 146. Male coupling member 12 is at this point free to be withdrawn from socket 22 of female coupling member 14.

In the event it should be determined that the degree of compression which is exerted upon sealing means 84 by compression plate member 52 is more or less than that desired for optimum performance, a suitable tool may be applied to wrench engaging means 194 to vary the axial position of hub 146 relative to female coupling member 14, thereby to adjust the distance compression plate member 52 is ultimately moved in response to the action of the operating means.

We claim:

1. Method of assembling coupling nuts to coupling bodies having complementary threads therefor comprising the steps of:
   (a) providing a base means having a plurality of closely spaced adjacent apertures arranged in a plurality of rows;
   (b) inserting coupling bodies having unthreaded portions and threaded portions into at least two of said apertures in adjacent pairs of rows such that at least part of said unthreaded portions and threaded portions are exposed;
   (c) positioning an elongated holding means in frictional engagement with the unthreaded portions of said coupling bodies in an adjacent pair of rows to hold and thereby prevent rotation of said bodies in said pair of rows, and
   (d) rotating said coupling nuts to thread said nuts onto said coupling bodies.

2. A method of connecting a plurality of fluid lines to a common base comprising: providing a base having a plurality of closely spaced apertures arranged in a plurality of rows; placing in each aperture a coupling member having multisurfaced tool pad means abutting the base adjacent the aperture and rotatable coupling nut means threaded on the free end thereof; positioning an elongated holding means between adjacent rows of coupling members and in simultaneous frictional engagement with the tool pad means of coupling members in said adjacent rows; inserting fluid conducting lines in each coupling member whose tool pad means are engaged by the elongated holding means; rotating each coupling nut means in said adjacent rows while the holding means restrains the tool pad means from rotation thereby to tighten the coupling nut on the coupling member and secure the fluid lines to the coupling member; and removing the elongated holding means from frictional engagement with the tool pad means.

3. A method of connecting a plurality of fluid lines to a common base comprising: providing a base having a plurality of closely spaced apertures in a plurality of rows; placing in each aperture a coupling member having a rotatable coupling nut means threaded on the free end thereof and multisurfaced tool pad means; inserting fluid conducting lines in each of a plurality of adjacent coupling members; simultaneously restraining from rotation by use of an elongated tool the tool pad means of each adjacent coupling member in an adjacent pair of rows in which there is received a fluid conducting line; and individually rotating each coupling nut means in said pair of rows thereby to tighten the coupling nut on the coupling member and secure the fluid lines to the coupling members.

4. A method of connecting a plurality of fluid lines to a common base comprising: providing a base having a plurality of closely spaced apertures in a plurality of rows; placing in each aperture a coupling member having rotatable coupling nut means threaded on the free end thereof; inserting a fluid conducting line in each of several of said coupling members; by use of an elongated tool; simultaneously restraining from rotation relative to said base each coupling member in an adjacent pair of rows in which there is received a fluid conducting line while individually rotating each coupling nut in said pair of rows thereby to tighten the coupling nut on the coupling member and secure the fluid lines to the coupling members.

References Cited by the Examiner

UNITED STATES PATENTS

| | | | |
|---|---|---|---|
| 1,511,913 | 10/1924 | Saunders. | |
| 2,196,929 | 4/1940 | Linzakowski | 81—13 |
| 2,202,895 | 6/1940 | Brinton | 81—13 |
| 2,664,770 | 1/1954 | Tomchek | 81—13 |

FOREIGN PATENTS

| | | |
|---|---|---|
| 110,652 | 5/1940 | Canada. |

CHARLIE T. MOON, *Primary Examiner.*